(12) United States Patent
Dandapat

(10) Patent No.: US 11,934,468 B2
(45) Date of Patent: Mar. 19, 2024

(54) CONTENT DISTRIBUTION CONTROL

(71) Applicant: Microsoft Technology Licensing, LLC, Redmond, WA (US)

(72) Inventor: Sandipan Dandapat, Kolkata (IN)

(73) Assignee: Microsoft Tech nology Licensing, LLC, Redmond, WA (US)

( * ) Notice: Subject to any disclaimer, the term of this patent is extended or adjusted under 35 U.S.C. 154(b) by 0 days.

(21) Appl. No.: 17/476,930

(22) Filed: Sep. 16, 2021

(65) Prior Publication Data

US 2023/0082939 A1    Mar. 16, 2023

(51) Int. Cl.
*G06F 16/9532* (2019.01)

(52) U.S. Cl.
CPC ............... *G06F 16/9532* (2019.01)

(58) Field of Classification Search
CPC ............... G06F 16/9532; H04L 63/101
See application file for complete search history.

(56) References Cited

U.S. PATENT DOCUMENTS

| | | | |
|---|---|---|---|
| 7,917,519 B2 | 3/2011 | Kimbrough et al. | |
| 10,572,511 B2 | 2/2020 | Anderson et al. | |
| 2007/0011154 A1* | 1/2007 | Musgrove | G06F 16/951 707/999.005 |
| 2013/0231922 A1* | 9/2013 | Park | G06F 40/30 704/9 |
| 2014/0136536 A1* | 5/2014 | Ramsey | G06F 16/248 707/733 |

FOREIGN PATENT DOCUMENTS

CN    101853298 B    8/2012

OTHER PUBLICATIONS

Agrawal, et al., "Multi-Label Learning with Millions of Labels: Recommending Advertiser Bid Phrases for Web Pages", In Proceedings of the 22nd International Conference on World Wide Web, May 13, 2013, 11 Pages.
Chuklin, et al., "Adult Query Classification for Web Search and Recommendation", In Proceedings of Search and Exploration of X-rated Information, Feb. 5, 2013, 3 Pages.
Gallant, et al., "Xu: An Automated Query Expansion and Optimization Tool", In Proceedings of IEEE 43rd Annual Computer Software and Applications Conference, Jul. 15, 2019, 11 Pages.
Liu, et al., "Query Expansion Based on Clustered Results", In Proceedings of the VLDB Endowment, vol. 4, No. 6, Aug. 29, 2011, pp. 350-361.
Liu, et al., "System Design of Extreme Multi-label Query Classification using a Hybrid Model", In Proceedings of the SIGIR eCom Workshop, Jul. 2019, 8 Pages.
Loupy, et al., "Query Expansion and Classification of Retrieved Documents", In TREC, Jan. 1998, 8 Pages.
Yue, et al., "Using Query Expansion and Classification for Information Retrieval", In Proceedings of 1st International Conference on Semantics, Knowledge and Grid, Nov. 27, 2005, 6 Pages.

* cited by examiner

*Primary Examiner* — Kannan Shanmugasundaram
(74) *Attorney, Agent, or Firm* — RAY QUINNEY & NEBEKER P.C.; Paul N. Taylor

(57) ABSTRACT

The present disclosure relates to methods and systems for controlling content distribution. The methods and systems receive an original search query and expand the original search query by adding one or more neutral words to create an expanded search query. The methods and systems automatically classify the original search query using the expanded search query in an accurate manner and use the classification to control content distribution.

17 Claims, 5 Drawing Sheets

CONTENT DISTRIBUTION CONTROL

BACKGROUND

A major challenge of all search engines is to control distribution of content so as to block unwanted content to make the search safe and trustworthy. Unwanted content may leak through in search results through mistakes of the search engines or improper classifications of search queries. As such, users may view or access unwanted content in response to a search query. In addition, companies that provide the search functionalities may face unwanted public relations issues in response to unwanted content presenting in search results.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for performing a classification for a search query. The method includes receiving an original search query. The method includes expanding the original search query by adding one or more neutral words to create an expanded search query. The method includes classifying the original search query using the expanded search query. The method includes automatically controlling distribution of content at least according to the classification of the original search query.

Another example implementation relates to a system. The system includes one or more processors; memory in electronic communication with the one or more processors; and instructions stored in the memory, the instructions executable by the one or more processors to: receive an original search query; expand the original search query by adding one or more neutral words to create an expanded search query; classify the original search query using the expanded search query; and automatically control distribution of content at least according to the classification of the original search query.

Another example implementation relates to a method for identifying neutral words. The method includes extracting a plurality of words from labelled data for a domain. The method includes for each word of the plurality of words: determining whether the word is distributed between a positive class and a negative class of the domain; and adding the word to a list of neutral words based on identifying the word as a being distributed between the positive class and the negative class.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
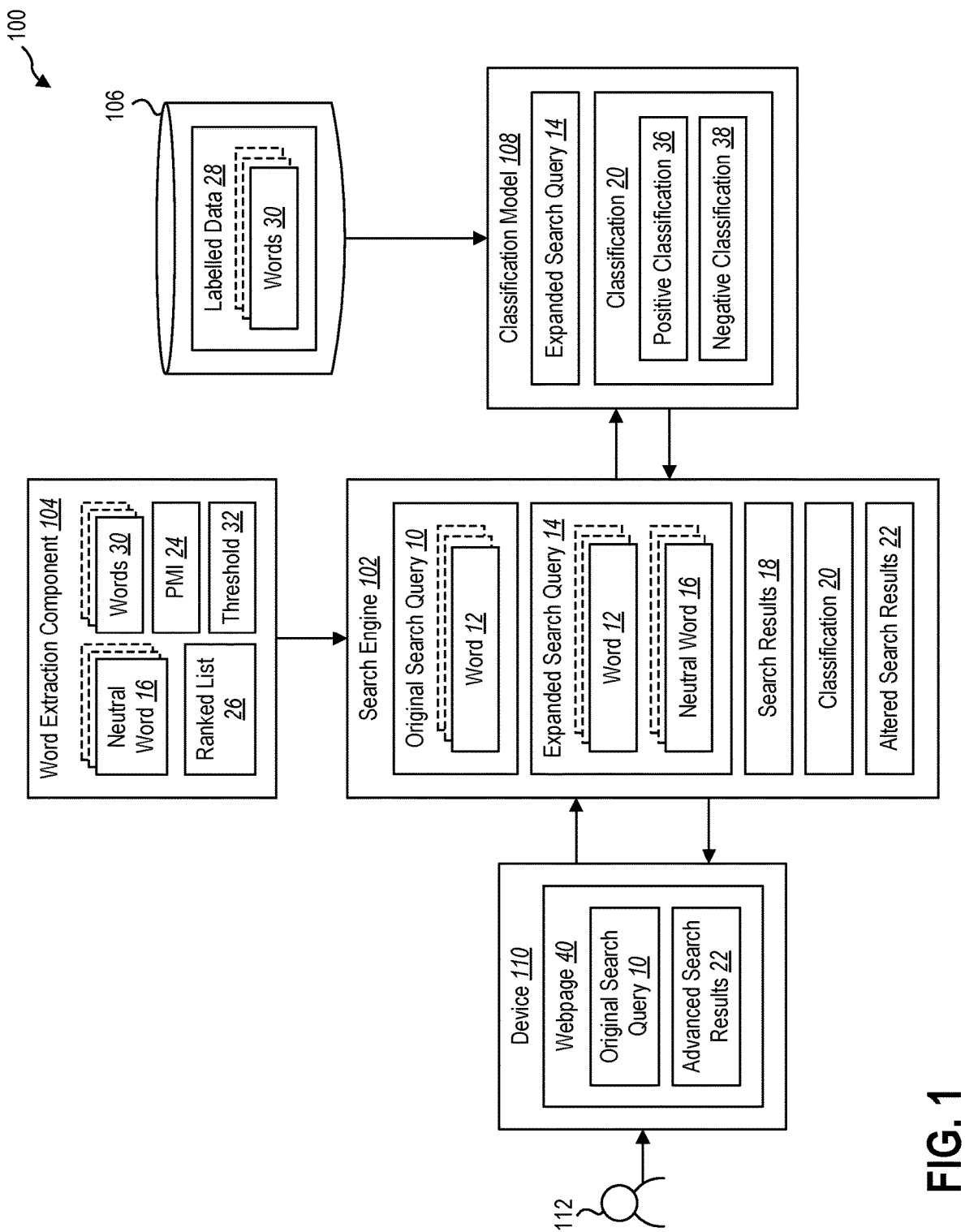
FIG. 1 illustrates an example system for processing a search query for classifying queries and controlling content distribution in accordance with implementations of the present disclosure.

This disclosure generally relates to classifying search queries and controlling distribution of content accordingly. A major challenge of all search engines is to block unwanted content to make the search safe and trustworthy. Unwanted content may leak through in search results through mistakes of the search engines or improper classifications of search queries.

One example of unwanted content is adult content. Users often try to find adult/mature content by querying the search engine. The adult content may be presented in the search engine result page (SERP) for some users to serve their search query. However, depending on the demography, age, and other local or personal information of the users, a search engine needs to restrict the SERP results to make the search safe and trustworthy. Making the search safe and trustworthy may include blocking adult content in the SERP or not showing any information if the query is identified as adult intent query. Thus, classifying a query either as adult or non-adult is important to restrict unwanted content flow. Search engines may have different search modes (strict, moderate, and off) for the users based on user preference. For example, the strict mode may trigger a block screen for adult intent queries and filter all known adult content results from the search results for non-adult intent queries. The moderate and off modes may promote adult known documents for adult intent queries and may filter out known adult documents from search results that are not related to adult intents. As such, classifying the intent (adult or non-adult) of the query is important to provide safe searching by altering the SERP content based on the intent of the query.

A main challenge of any query classification is trying to classify a search query using a small context (one or two words) of the search query, which may not provide enough information to the classifier. Often search queries are shorter in length. An average search query is generally less than five words. While a search engine may easily classify an adult query with words that explicitly refer to adult content, a search engine may have difficulty classifying a search query with the absence of specific adult terms or search query with ambiguous search terms related to adult content (e.g., an adult movie name, an adult entertainer name, an acronym for adult related content, a website with adult related content). As such, the failure of the classification of queries is more prevalent when the length of the search query is short, and the search query does not include explicit adult content in the surface form, resulting in leakage in the SERP.

Machine learning models may be used to build a classifier to classify the search queries. The machine learning models encode knowledge from several resources (e.g., labelled training data and unlabeled pre-training corpora) to perform a task. Different approaches try to enhance the knowledge of the machine learning models by incorporating information from other resources (e.g., lexicon, knowledge graph, target labelled data, etc.) to improve the model.

One current approach is to attempt to use more training data specific to the errors of the misclassified queries and improve the machine learning models. Using more training data specific to the errors is effective as the models sometimes generalize over the training data and/or memorize the training data. However, this approach is not very effective for many misclassified adult queries with named entities (name of an adult movie, name of an adult entertainer, or a name of an adult web site). Enumerating all named entities related to adult content is difficult.

Another current approach is to try and improve the machine learning models by adding additional information along with the labelled data to improve the embedded knowledge of the models and improve overall capability of the models. While this approach is useful, the approach does not provide any targeted improvement for specific type of failures.

The present disclosure provides methods and systems that do not change the machine learning models (often expensive) but modify the search query to classify the modified queries using the same model. The methods and systems expand the search queries by a set of keywords to improve the classification of the search queries. The query expansion techniques use neutral words, which have co-occurrence statistics with both a positive class and a negative class of a domain, as the set of keywords. Thus, the query expansion technique ensures capturing many false negatives in the search queries but does not generate additional false positives for the search queries.

The neutral words are extracted from the training data based on the neutral word's pointwise mutual information (PMI) with respect to a positive class and a negative class of a domain. For example, the positive class is adult content, and the negative class is non-adult content. The neutral words are added to the search query for expansion, resulting in more information for the classifier to use in determining an intent of the search query. More than one neutral word may be added to the search query. In addition, a plurality of search queries may be formed using different neutral words. As such, the present disclosure improves query classification when there is little or no context available in the search query.

One technical advantage of the present disclosure is the improvement of the performance of the machine learning models without targeted data collection (cost savings) and costly retraining of the machine learning models when leakages of unwanted content occur in the search results. The methods and systems use the available training data (on which the model was built) to construct the expanded query. The methods and systems automatically extract and expand the query using the same model. As such, the methods and systems reduce targeted data collection efforts for each mistake a model makes, and subsequently, reduces model re-training to address leakage of unwanted content in the search results and so provide more accurate content distribution control.

The present disclosure allows different neutral words or a number of neutral words to include in the original search query to control the precision and recall of the machine learning models. As such, the present disclosure does not use additional data or change the machine learning models (both are costly and time-consuming), but instead, the present disclosure modifies the search query by expanding the search query with neutral words to form a new expanded query to aid in classifying the search query intent.

Referring now to FIG. 1, illustrated is an example system 100 for processing a search query for classifying queries and automatically controlling content distribution. The system 100 may include a search engine 102 that receives an original search query 10. For example, users 112 of the system 100 may provide the original search query 10 to the search engine 102 through a webpage 40 of a browser on a device 110. The browser allows the users to interact with information on the World Wide Web, for example, by providing the original search query 10 to the search engine 102 and receiving search results 18 with websites or other content from the World Wide Web from the search engine 102 in response to the original search query 10. The browser may be a browser application on a device 110 of the user 112. Examples of browsers include, but are not limited to, EDGE™ and INTERNET EXPLORER™. While one device 110 is illustrated and one user 112, the system 100 may include any number of devices 110 and users 112.

The original search query 10 may include one or more words 12 which are referred to as search terms. The words 12 may include websites, acronyms, proper names, abbreviations, titles, and/or any combination of characters.

The system 100 may also include a word extraction component 104 in communication with the search engine 102. The word extraction component 104 may access labelled data 28 for the search engine 102 from one or more datastores 106. The labelled data 28 comprises previously observed search queries received by the search engine 102 and where individual ones of the search queries are labelled with a class label from a set of possible classes. A non-exhaustive list of possible classes is adult content, not adult content. The labelled data 28 may be generated from users 112 worldwide based on the interactions of the users 112 with the search engine 102. For example, the labelled data 28 provides information on search queries entered by millions of users worldwide for a variety of domains, where a domain is a topic or subject area having a positive class and a negative class. In addition, the labelled data 28 may include one or more annotations with the domains for the search queries. The labelled data 28 may be manually marked or annotated with one or more positive and negative classes of domains. In some cases, the labels are applied automatically using an automated classifier.

An example domain includes adult content and the labelled data 28 includes annotations indicating whether the labelled data 28 contains search queries for adult content or non-adult content. For example, a search query for "Olympics" has an annotation indicating that the search query is not related to adult content while a search query with terms that explicitly identified adult content has an annotation indicating that the search query is related to adult content. Another example domain includes DIY content and the labelled data 28 includes annotations indicating whether the labelled data 28 contains search queries for DIY content or non DIY content. For example, a search query with the words "build your own birdhouse" has an annotation indicating that the search query is related to DIY content while a search query with the words "how long does it take to drive from New York to Boston" has an annotation indicating that the search query is not related to DIY content. Another example domain includes travel content and the labelled data 28 has annotations indicating whether the labelled data 28 includes search queries for travel content or non-travel content.

In an implementation, different databases or datastores 106 may include different domains of labelled data 28. As such, different databases or datastores 106 of the labelled data 28 may be based on different domains (e.g., adult content, DIY, travel, sports, etc.).

The word extraction component 104 may extract one or more neutral words 16 from the labelled data 28. The neutral words 16 may be words semantically unrelated to the words 12 of the original search query 10. The neutral words 16 may be used to improve the classification of the original search query 10. The neutral words 16 may expand the original search query 10 to provide additional context for the classification of the original search query 10. A neutral word is as likely to co-occur with words in the positive class of the domain as with words in the negative class of the domain.

Search queries that are shorter in length without explicit words in the search query identifying the domain of the search query may be difficult to classify as relating to a particular domain. Search queries with acronyms may also be difficult to classify into a specific domain. For example, a search query with an acronym for adult content or adult entertainment may be difficult to classify as a search within the adult content domain. In addition, search queries targeted with a specific website, or a specific named entity may be difficult to classify into a specific domain. For example, a search query with a name of an adult entertainer (e.g., Jane Doe) or a name of an adult movie may be difficult to identify as a search query for adult content.

The neutral words 16 may help the classification model 108 identify an intent of the original search query 10 by pushing the expanded search query 14 to either the positive class of the domain or the negative class of the domain. The neutral words 16 may be equally positive or negative. The neutral words 16 may have an equal probability of being in the positive class or negative class of a domain. The neutral words 16 may be domain specific. As such, different neutral words 16 may be selected for different domains. The neutral words 16 may drive an ambiguous search query to a correct positive classification or a correct negative classification of the original search query 10 without providing false classifications of the original search queries 10.

The labelled data 28 may include a collection of words 30 included in the search queries (e.g., several hundred thousand words included in the search queries). The word extraction component 104 may determine whether each word 30 is associated with a positive class of a domain, a negative class of a domain, or distributed among the positive class and the negative class (e.g., the word has an equal probability of being in the positive class or the negative class). Since each search query instance in the labelled training data has a label indicating whether it is in a positive class of a given domain or a negative class of the given domain, a count of the frequency of occurrence of words from the search queries in the positive and negative classes of each domain may be obtained. The word extraction component 104 may use the PMI 24 of the words 30 to determine, for each domain, whether the words 30 are associated with a positive class of the domain, a negative class of the domain, or equally distributed among the positive class and the negative class of the domain. If the word 30 is distributed closely among the positive class and the negative class, the word 30 may be identified as a neutral word 16. In this way a database of neutral words is built up and stored, where the database has for each of a plurality of domains, a list of neutral words.

An example equation that the word extraction component 104 may use in identifying the neutral words 16 includes:

$$|\text{PMI}(e_i, +ve) - \text{PMI}(e_i, -ve)| \le \theta(\sim 0) \qquad (1)$$

where $e_i$ is a word 30 from the labelled data 28; +ve is the occurrence of the word in the positive class of the domain; −ve is the occurrence of the word in the negative domain; and theta is a threshold with a value close to zero. For example, the threshold may be a value of 0.5. The threshold may be larger or smaller based on the domain or user preferences.

By taking the absolute difference of the occurrence of the word 30 in the positive class and the occurrence of the word 30 in the negative class, the word extraction component 104 determines whether the word 30 is distributed in the positive class of the domain, distributed in the negative class of the domain, or the word 30 is neutral (e.g., close to zero).

If the absolute difference of the occurrence of the word 30 is a number above the threshold, the word extraction component 104 may determine that the word 30 is biased towards a class and is distributed either in the positive class of the domain or the negative class of the domain, and therefore, the word 30 is not a neutral word. A word 30 that is biased towards a specific class (e.g., positive or negative) may drive search queries towards the class or away from the class if added to the search query. For example, if a word 30 identified as being biased toward adult content (e.g., a word that explicitly refers to adult content) is added to the search queries for the expansion, the expanded search queries 14 may be pushed towards the adult domain during the classification even if the intent of the search queries was non-adult.

If the absolute difference of the occurrence of the word 30 in the positive class and the negative class is a number below the threshold, the word extraction component 104 may determine that the word 30 is neutral (e.g., the word 30 has an equal probability of operating in both the positive class and the negative class of the domain). As such, the neutral words 16 have a co-occurrence statistics with both the positive class and the negative class of the domain. Moreover, the neutral words 16 may have different connotations in the positive class and the negative class, and thus, when added to the search queries, may provide additional context to the original search query 10 and help drive an ambiguous search query to a correct positive or correct negative classification.

The word extraction component 104 may remove articles and other stop words from the identified neutral words 16.

Adding articles or other stop words to the original search query 10 may not provide additional context that helps the classification model 108 identify the domain intent of the original search query 10. One example use case includes three remaining neutral words 16 after the removal of the stop words.

In the use case of the adult content domain, example of neutral words 16 may include, but are not limited to, video, images, website, or movie. As such, video, images, websites, and/or movie, are equally likely to show up in searches related to adult content and searches not related to adult content. However, when video, images, websites, and/or movie are added to the original search query 10 to create the expanded search query 14, the expanded search query 14 may be pushed to a correct classification of being for adult content or for non-adult content.

The word extraction component 104 may provide a ranked list 26 of the neutral words 16. The neutral words 16 may be ranked based on a frequency of the neutral words 16 appearing in the labelled data 28. The neutral words 16 with a higher frequency (e.g., occur more frequently in the labelled data 28) may be placed higher in the ranked list 26 relative to the neutral words 16 with a lower frequency (e.g., occur less frequently in the labelled data 28). Neutral words 16 with a lower frequency may identify outlier words.

The search engine 102 may receive the neutral words 16 and may expand the original search query 10 with the neutral words 16 to create an expanded search query 14. The expanded search query 10 may include the words 12 from the original search query 10 and one or more of the neutral words 16. A single neutral word 16 may be selected to expand the original search query 10 or a combination of the neutral words 16 may be selected to expand the original search query 10. As such, a different number of neutral words 16 may be selected or different combinations of the neutral words 16 may be selected to control the precision and recall of the search engine 102.

One or more of the neutral words 16 may be selected from the ranked list 26 to use for expanding the original search query 10. The selection of the neutral words 16 may be based on system performance considerations. For example, the search engine 102 may select the highest ranked neutral word 16 from the ranked list 26 and may create the expanded search query 14 with the words 12 from the original search query 10 and the highest ranked neutral word 16. By selecting a single neutral word 16, the additional latency to the system 100 may be limited. Another example includes the search engine 102 expanding the search engine 102 with three of the neutral words 16 (e.g., the top three neutral words 16 are selected from the ranked list 26). The expanded search query 14 may include the words 12 from the original search query 10 and the three neutral words 16.

Moreover, different iterations of expanding the original search query 10 may occur. For example, the search engine 102 may expand the original search query 10 with a first neutral word 16 and receive the classification 20 of the expanded search query 14. The search engine 102 may add a second neutral word 16 to the expanded search query 14 and receive the classification 20 of the expanded search query 14 with both neutral words 16 (e.g., the first neutral word and the second neutral word). The iterations may continue until the classification 20 remains the same for the expanded search queries 14 with the additions of the neutral words 16 or until a predetermined number of neutral words 16 are added to the expanded search query 14.

Another example includes the search engine 102 creating three different expanded search queries 14 with three different neutral words 16 or three different combinations of neutral words 16 and sending three different expanded search queries 14 to the classification model 108 for classification. The final classification of the original search query 10 may be based on whether the classification 20 of any of the expanded search queries 14 indicated a positive class or a negative class of a domain. In addition, the final classification of the original search query 10 may be based on a majority of the classifications 20 of the expanded search queries 14 indicating a positive class or a negative class of a domain. The final classification 20 of the original search query 10 may also be based on whether all of the classifications 20 of the expanded search queries 14 indicated a positive class or a negative class of a domain.

The classification model 108 may be trained to classify whether a search query is related to a specific domain. The classification model 108 may include any type of machine learning model which is a binary classifier. The classification model 108 may be any text binary classifier that receives text as input. In addition, the classification model 108 may include a plurality of machine learning models running simultaneously.

The classification model 108 receives the expanded search query 14 from the search engine 102 and generates a classification 20 of the expanded search query 14. The classification 20 may include a positive classification 36 (e.g., the expanded search query 14 is related to the domain) or a negative classification 38 (e.g., the expanded search query 14 is not related to the domain). In an implementation, the classification model 108 outputs a binary classification 20. For example, the classification model 108 outputs a "1" as the positive classification 36 and a "0" as the negative classification 38.

By adding one or more of the neutral words 16 to the original search query 10 to create the expanded search query 14, the classification model 108 may have additional context to use and correctly identify the expanded search query 10 as belonging to the positive class of the domain (e.g., the intent of the original search query 10 is the domain) or the negative class (e.g., the intent of the original search query 10 is not for the domain). As such, if the original search query 10 is ambiguous or difficult to classify by the classification model 108, by expanding the original search query 10 with one or more neutral words 16, the classification model 108 may use the expanded search query 14 to correctly classify the intent of the original search query 10.

In the use case of the adult content domain, example of neutral words 16 may include, but are not limited to, video, images, website, or movie. For example, if the original search query 10 was a name of an adult web site and the classification model 108 misclassified the original search query 10 as non-adult content, by adding one or more neutral words 16 (video, images, website, movies) to the original search query 10 in the expanded search query 14, the classification model 108 may correctly classify the expanded search query 14 as relating to adult content and identify the intent of the original search query 10 as adult content.

The search engine 102 automatically controls content distribution according to at least the classification of the expanded search query. The end user does not have to manually modify the query so there is no additional burden on the user. In various examples the search engine 102 provides altered search results 22 based on the classification 20. One example of the altered search results 22 is blocking or preventing content or websites from appearing in the altered search results 22 based on the classification 20. For example, if the classification 20 for the expanded search query 10 included a positive classification 36 for an adult content domain, the altered search results 22 may prevent any content or websites from appearing in response to the original search query 10.

Another example of the altered search results 22 is providing a ranked list of search results based on the classification 20. For example, if the classification 20 for the expanded search query 10 included a positive classification 36 for a travel domain, the altered search results 22 may rank websites or content related to travel higher relative to other websites or content and present the travel related websites and content higher in the search results relative to the other web sites or content.

Another example of the altered search results 22 is filtered search results (e.g., the search engine 102 removes content or websites from the search results 18 for the original search query 10 based on the classification 20). If the classification 20 for the expanded search query 10 includes a negative classification 38 for an adult content domain, the altered search results 22 may remove images and videos related to adult content from presenting in the altered search results 22.

In an implementation, the search engine 102 controls content distribution based on a mode of operation for the search engine 102 as well as the classification of the expanded search query. For example, if the mode of operation for the search engine is to block all adult content for the user profile (e.g., a child is performing the search), if the classification 20 for the expanded search query 10 includes a negative classification 38 for an adult domain (e.g., the intent of the expanded search query 10 is for non-adult content), all known adult content results or adult webpage results may be filtered out of the altered search results 22 to prevent adult content from displaying in the altered search results 22. The mode of operation for the search engine is identified from browser settings of a browser of an end user device 110 which submits the search query.

The search engine 102 may select a specific interface to present the altered search results 22 based on the classification 20. For example, if the classification 20 indicated that the expanded search query 14 is a positive classification 36 for a DIY domain, the altered search results 22 may be presented using an interactive cascading waterfall interface. The selected interface to present the altered search results 22 may be visually distinct or different from an interface that presents the search results 18. By using the selected interface end users 112 have a visual indication of the internal state of the computing system with regard to whether or not content distribution is being controlled automatically.

The system 100 may have multiple machine learning models running simultaneously. One or more of the search engine 102, the word extraction component 104, and/or the classification model 108 may have one or more machine learning models that run concurrently to perform the processing. In some implementations, one or more computing devices (e.g., servers) are used to perform the processing of system 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the search engine 102, the word extraction component 104, the datastores 106, and/or the classification model 108 are implemented wholly on the same computing device. Another example includes one or more subcomponents of the search engine 102, the word extraction component 104, the datastores 106, and/or the classification model 108 implemented across multiple computing devices. Moreover, in some implementations, the search engine 102, the word extraction component 104, the datastores 106, and/or the classification model 108 are implemented or processed on different server devices of the same or different cloud computing networks.

In some implementations, each of the components of the system 100 is in communication with each other using any suitable communication technologies. In addition, while the components of the system 100 are shown to be separate, any of the components or subcomponents may be combined into fewer components, such as into a single component, or divided into more components as may serve a particular embodiment. In some implementations, the components of the system 100 include hardware, software, or both. For example, the components of the system 100 may include one or more instructions stored on a computer-readable storage medium and executable by processors of one or more computing devices. When executed by the one or more processors, the computer-executable instructions of one or more computing devices can perform one or more methods described herein. In some implementations, the components of the system 100 include hardware, such as a special purpose processing device to perform a certain function or group of functions. In some implementations, the components of the system 100 include a combination of computer-executable instructions and hardware.

As such, the system 100 may be used to expand the original search query 10 by automatically extracting neutral words 16 and adding one or more neutral words 16 to create an expanded search query 14 to more accurately classify the original search query 10 as being directed towards a specific domain or not. The query expansion technique ensures capturing many false negatives (e.g., original search queries 10 misclassified by the classification model 108) while preventing the generation of additional false positives (e.g., the classification model 108 misclassifying the expanded search query 14). In this way the classification is well suited for enabling automatic control of content distribution.

Figure 2:
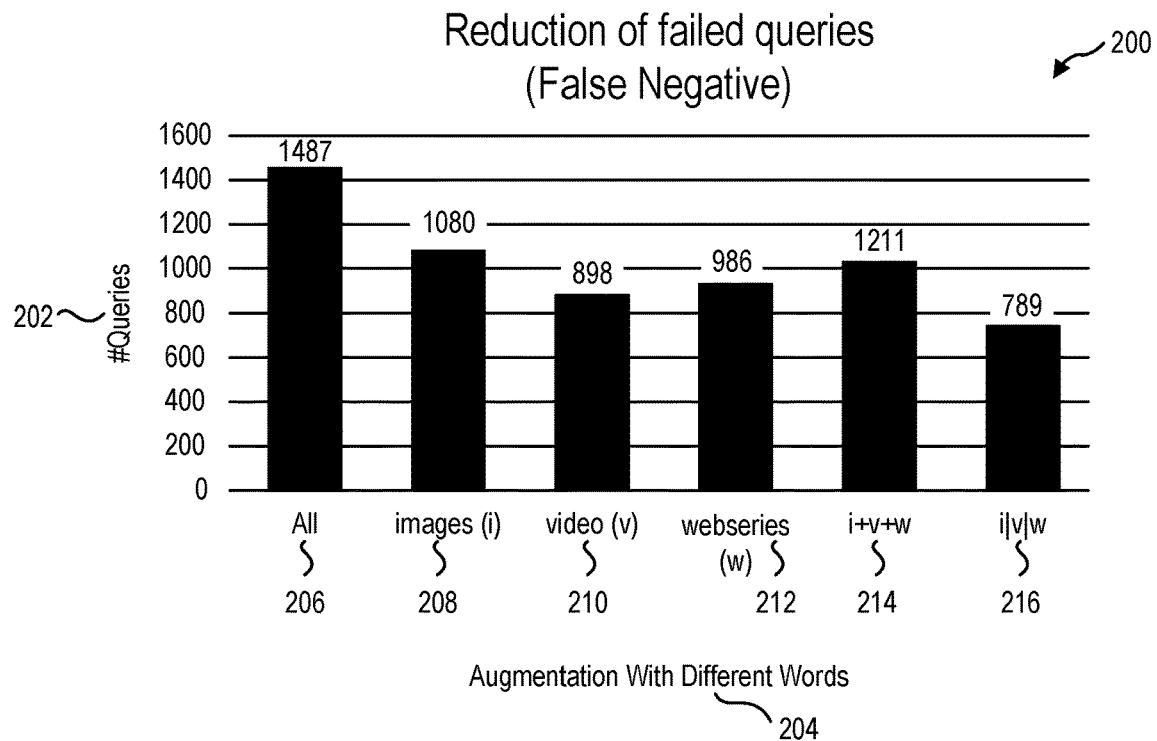
FIG. 2 illustrates an example graph illustrating a reduction in the misclassification of search queries in accordance with implementations of the present disclosure.

Referring now to FIG. 2, illustrated is an example graph 200 for showing the results of an example use case using the system 100 (FIG. 1) to classify the expanded search queries 14. The graph 200 illustrates the reduction in the misclassification of failed queries (false negative queries) for adult content by the classification model 108 by analyzing the expanded search queries 14 as compared to the original search queries 10. The false negative queries indicated that the classification model 108 identified the intent of the original search queries 10 for non-adult content when the intent of the original search queries 10 was for adult content. The graph 200 illustrates adding different neutral words 16 to expand the original search query 10 and the results of adding the neutral words 16.

The graph 200 has a y-axis 202 with the number of queries and an x-axis 204 with the different search queries analyzed. The queries 206 illustrates the 1487 false negative classifications of the original search queries 10 by the classification model 108 (e.g., the classifier failed to identify the queries has having an intent for adult content). The queries 208 illustrates adding the term "image" as the neutral word 16 to the original search query 10 to expand the original search query 10. The classification model 108 reduced the false negative classifications from 1487 queries to 1080 queries by analyzing the expanded search query 14 with the term "image" added to the original search query 10.

The queries 210 illustrates adding the term "video" as the neutral word 16 to the original search query 10 to expand the original search query 10. The classification model 108 reduced the false negative classifications from 1487 queries to 898 queries by analyzing the expanded search query 14 with the term "video" added to the original search query 10.

The queries 212 illustrates adding the term "website" as the neutral word 16 to the original search query 10 to expand the original search query 10. The classification model 108 reduced the false negative classifications from 1487 queries to 986 queries by analyzing the expanded search query 14 with the term "website" added to the original search query 10.

The queries 214 illustrates adding the terms "image," "video," and "website" to the original search query 10 to expand the original search query 10 into three different expanded search queries 14 (e.g., one expanded search query 14 with images, a different expanded search query 14 with video, and another expanded search query 14 with websites). A majority vote determines whether the three expanded search queries 14 are for adult content. The plus sign indicates a logical AND operation. The classification model 108 reduced the false negative classifications from 1487 queries to 1211 queries by analyzing the expanded search query 14 with the terms "image," "video," and "website" added to the original search query 10.

The queries 216 illustrates adding a combination of the terms "image," "video," and "website" to the original search query 10 to expand the original search query 10. A fixed combination of the terms is used for the queries 216. For example, if two terms ("images" and "website" or "video" and "images" or "video" and "website") are selected for the expansion, the same two terms ("images" and "website" or "video" and "images" or "video" and "website") are added to all of the queries 216. If all three terms ("images", "videos", and "images") are selected for the expansion, all terms are added to all of the queries 216. The vertical line symbol indicates a logical OR operation. The classification model 108 reduced the false negative classifications from 1487 queries to 749 queries by analyzing the expanded search query 14 with a combination of the terms "image," "video," and "website" added to the original search query 10.

As such, out of the 1487 false negative classifications from the classification model 108, the query expansion technique reduces the false negative classifications around fifty percent using a combination of the neutral words 16 "image," "video," and "website" to expand the original search query 10. Moreover, if a user selects to use only one expanded query for analysis by the classification model 108 (e.g., for reducing latency), adding the term "video" as the neutral word 16 to expand the original search query 10 reduced the false negative classifications to around sixty percent.

Figure 3:
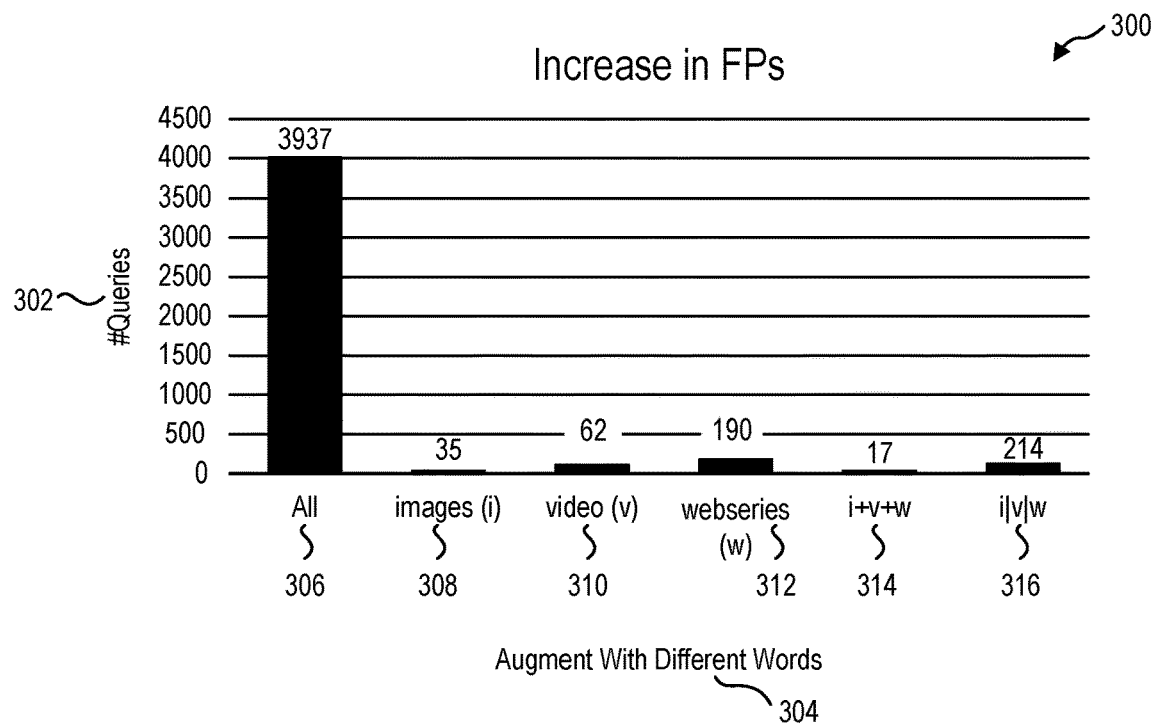
FIG. 3 illustrates an example graph illustrating misclassification of search queries in accordance with implementations of the present disclosure.

Referring now to FIG. 3, illustrated is an example graph 300 for showing the results of an example use case using the system 100 (FIG. 1) of misclassification of the expanded search queries 14 by the classification model 108. The graph 300 illustrates adding different neutral words 16 to expand the original search query 10 and the results of adding the neutral words 16. The original search queries 10 included in the graph 300 include search queries known to have non-adult content for the query. The graph 300 has a y-axis 302 with the number of queries and an x-axis 304 with the different queries analyzed.

The queries 306 include the clean queries analyzed by the classification model 108 (e.g., the 3937 queries known to have non-adult content). The queries 308 illustrate adding the term "image" as the neutral word 16 to the original search query 10 to expand the original search query 10. The classification model 108 incorrectly classified 35 of the 3937 expanded search queries 14 as relating to adult content by analyzing the expanded query 14 with the term "image" added to the original search query 10.

The queries 310 illustrate adding the term "video" as the neutral word 16 to the original search query 10 to expand the original search query 10. The classification model 108 incorrectly classified 62 of the 3937 expanded search queries 14 as relating to adult content by analyzing the expanded query 14 with the term "video" added to the original search query 10.

The queries 312 illustrate adding the term "website" as the neutral word 16 to the original search query 10 to expand the original search query 10. The classification model 108 incorrectly classified 190 of the 3937 expanded search queries 14 as relating to adult content by analyzing the expanded query 14 with the term "website" added to the original search query 10.

The queries 314 illustrate adding the terms "image," "video," and "web site" as the neutral terms to the original search query 10 to expand the original search query 10. The classification model 108 incorrectly classified 17 of the 3937 expanded search queries 14 as relating to adult content by analyzing the expanded query with the terms "image," "video," and "website" added to the original search query 10.

The queries 316 illustrate adding a combination of the terms "image," "video," and "website" as the neutral terms to the original search query 10 to expand the original search query 10. The classification model 108 incorrectly classified 76 of the 3937 expanded search queries 14 as relating to adult content by analyzing the expanded query with a combination of the terms "image," "video," and "website" added to the original search query 10.

As such, the classification model 108 only misclassified a small portion of the queries 306 after the query expansion occurred on the original search queries 10 as compared to the number of search queries correctly classified as shown in the graph 200 (FIG. 2).

Figure 4A:
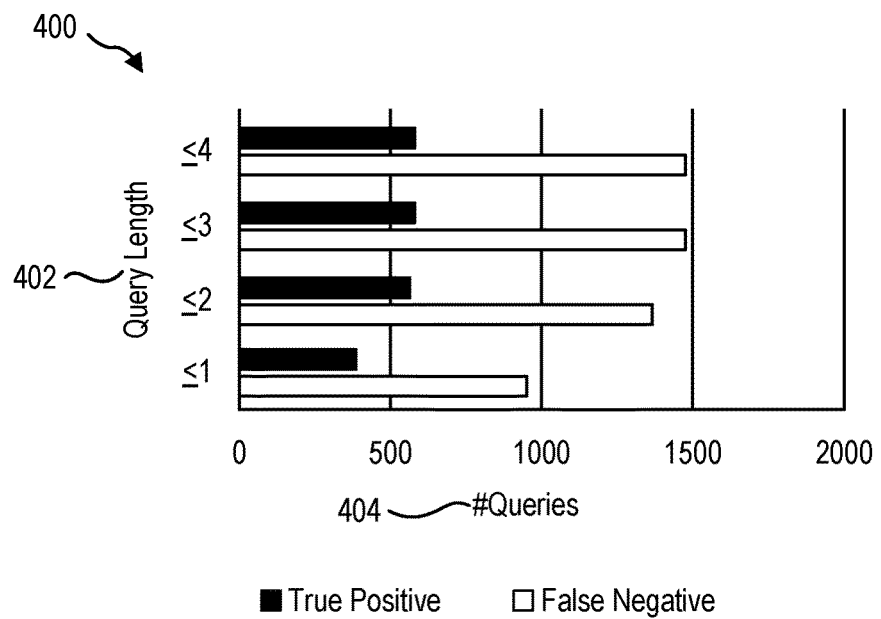
FIGS. 4A and 4B illustrate example graphs of search query classifications relative to a length of the search queries in accordance with implementations of the present disclosure.

Referring now to FIG. 4A, illustrated is graph 400 that shows the number of original search queries 10 wrongly classified by the classification model 108 as compared to the number of expanded search queries 14 correctly classified by the classification model 108. The expanded search queries 14 added one or more neutral words 16 to expand the original search queries 10. The graph 400 has a y-axis 402 with the query length (e.g., words or characters of the search query) and an x-axis 404 with the number of queries. The false negative classification of the queries illustrates the misclassification of the original search queries 10 and the true positive classification of the queries illustrates the correct classification of the expanded search queries 14. As such, the classification model 108 may capture more false negatives of shorter original search queries 10 (e.g., less than four words or characters) by correctly identifying the expanded search queries 14 as true positives.

Figure 4B:
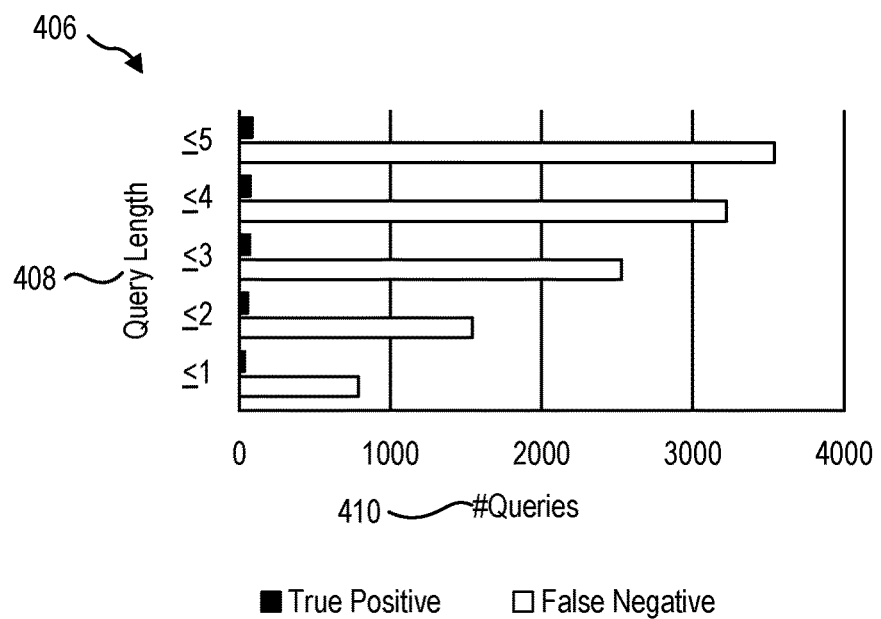

Referring now to FIG. 4B, illustrated is a graph 406 that shows the number of expanded search queries 14 misclassified as compared to the original search queries 10 by the classification model 108. The expanded search queries 14 added one or more neutral words 16 to expand the original search queries 10. The graph 406 has a y-axis 408 with the query length (e.g., words or characters of the search query) and an x-axis 410 with the number of queries. The false positive classification of the queries illustrates the misclassification of the expanded search queries 14 and the true negative illustrates the correct classification of the original search queries 10.

Figure 5:
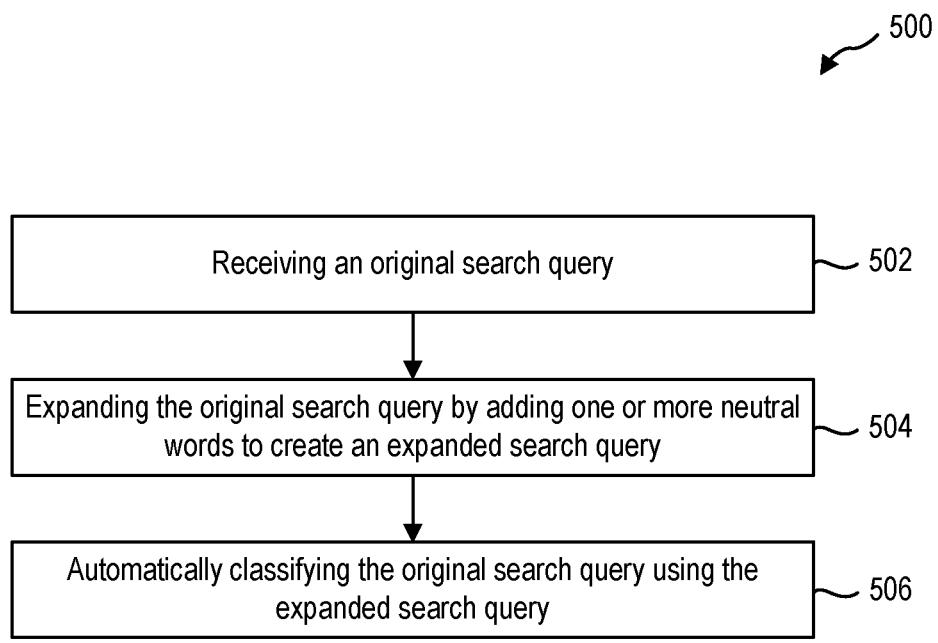
FIG. 5 illustrates an example method for performing a classification for a search query and automatically controlling distribution of content in accordance with implementations of the present disclosure.

Referring now to FIG. 5, illustrated is an example method 500 for performing a classification for a search query and controlling content distribution. The actions of the method 500 are discussed below with reference to the architecture of FIG. 1.

At 502, the method 500 includes receiving an original search query. The search engine 102 receives an original search query 10. For example, users of system 100 may provide the original search query 10 to the search engine 102 through a webpage of a browser. The original search query 10 may include one or more words 12 referred to as search terms. The words 12 may include websites, acronyms, proper names, abbreviations, titles, and/or any combination of characters. In addition, the original search query 10 may be for a specific domain (e.g., sports, weather, travel, cooking, DIY, adult content, etc.).

At 504, the method 500 includes expanding the original search query by adding one or more neutral words to create an expanded search query. The neutral words are obtained from a store of neutral words obtained in advance as explained with reference to FIG. 6 below. Original search queries 10 that are shorter in length (e.g., the query length is five words or less) without explicit words in the identifying the domain of the search may be difficult to classify into a specific domain. In addition, original search queries 10 with acronyms may also be difficult to classify into a specific domain. Search queries targeted with a specific website or specific named entity may also be difficult to classify into a specific domain.

The search engine 102 may obtain one or more neutral words 16 from a store which has been populated by a word extraction component 104. The neutral words 16 are to use in expanding the original search query 10 to create an expanded search query 14. The neutral words 16 may help the classification model 108 identify an intent of the original search query 10 by pushing the expanded search query 14 to either the positive class of the domain or the negative class of the domain. The neutral words 16 may have an equal probability of being in the positive class or negative class of a domain. In addition, the neutral words 16 may be domain specific. Thus, different neutral words 16 may be selected for different domains. The neutral words 16 may be selected independently from the words 12 included in the original search query 10. As such, the neutral words 16 may be unrelated to the words 12 included in the original search query 10. The search engine 102 identifies a domain of the original search query 10 and obtains neutral words 16 for the identified domain from the store. The search engine 102 identifies the domain by classifying the query terms of the original search query 10.

The expanded search query 10 may include the words 12 from the original search query 10 and one or more of the neutral words 16. A single neutral word 16 may be selected to expand the original search query 10 or a combination of the neutral words 16 may be selected to expand the original search query 10. In an implementation, the search engine 102 receives a ranked list 26 of neutral words 16 based on a frequency of the neutral words 16 in labelled data 28 for the domain. The search engine 102 may select the one or more neutral words 16 to include in the expanded search query 10 based on the ranking. As such, a different number of neutral words 16 may be selected or different combinations of the neutral words 16 may be selected to control the precision and recall of the search engine 102. In addition, the selection of the neutral words 16 may be based on system performance considerations (e.g., added latency concerns) or user preference (e.g., wanting to prevent any type of content from displaying). The neutral words 16 may be selected and added to the original search query 10 automatically without any need for the end user 112 to take any action.

In an implementation, the search engine 102 creates the expanded search query 14 by automatically completing the original search query 10 with the selected neutral words 16. As such, the neutral words 16 are automatically added to the original search query 10. In another implementation, the search engine 102 provides one or more expanded query suggestions with one or more neutral words 16.

At 506, the method 500 includes automatically classifying the original search query using the expanded search query. The classification model 108 receives the expanded search query 14 from the search engine 102 and generates a classification 20 of the expanded search query 14. The classification 20 may include a positive classification 36 (e.g., the expanded search query 14 is related to the domain) or a negative classification 38 (e.g., the expanded search query 14 is not related to the domain). In an implementation, the classification model 108 outputs a binary classification 20. For example, the classification model 108 outputs a "1" as the positive classification 36 and a "0" as the negative classification 38.

By adding one or more of the neutral words 16 to the original search query 10 to create the expanded search query 14, the classification model 108 may have additional context to use and correctly identify the expanded search query 10 as belonging to the positive class of the domain (e.g., the intent of the original search query 10 is the domain) or the negative class (e.g., the intent of the original search query 10 is not for the domain). As such, if the original search query 10 is ambiguous or difficult to classify by the classification model 108, by expanding the original search query 10 with one or more neutral words 16, the classification model 108 may use the expanded search query 14 to correctly classify the intent of the original search query 10. The classification model 108 may classify the original search query 10 using the expanded search query 14. The neutral words 16 added to the expanded search query 14 may drive an ambiguous original search query 10 or an original search query 10 that is difficult to classify to a correct positive classification 36 of a domain or a correct negative classification 38 of a domain without providing false classifications of the search queries.

The search engine 102 controls content distribution such as by providing altered search results 22 based on classifying the original search results using the expanded search query 14. One example of the altered search results 22 is blocking or preventing content or websites from appearing in the altered search results 22 based on the classification 20. Another example of the altered search results 22 is providing a ranked list of search results based on the classification 20. Another example of the altered search results 22 is filtering the original search results (e.g., the search engine 102 removes content or websites from the original search results 18 for the original search query 10 based on the classification 20). The search engine 102 may present a filtered subset of the original search results 18 that filters out the search results corresponding to the positive class (e.g., the search engine 102 may remove the search results 18 corresponding to adult content).

The search engine 102 may also select a different interface to present the altered search results 22 based on the classification 20. For example, if the classification 20 indicated that the expanded search query 14 is a positive classification 36 for a DIY domain, the altered search results 22 may be presented using an interactive cascading waterfall interface.

As such, the method 500 may be used for enriching the original search queries 10 for classifying queries by expanding the original search queries 10 by adding one or more non-semantic neutral words to create an expanded search query 14, and the expanded search query 14 may be used for classifying the original search query 10 into a domain.

Figure 6:
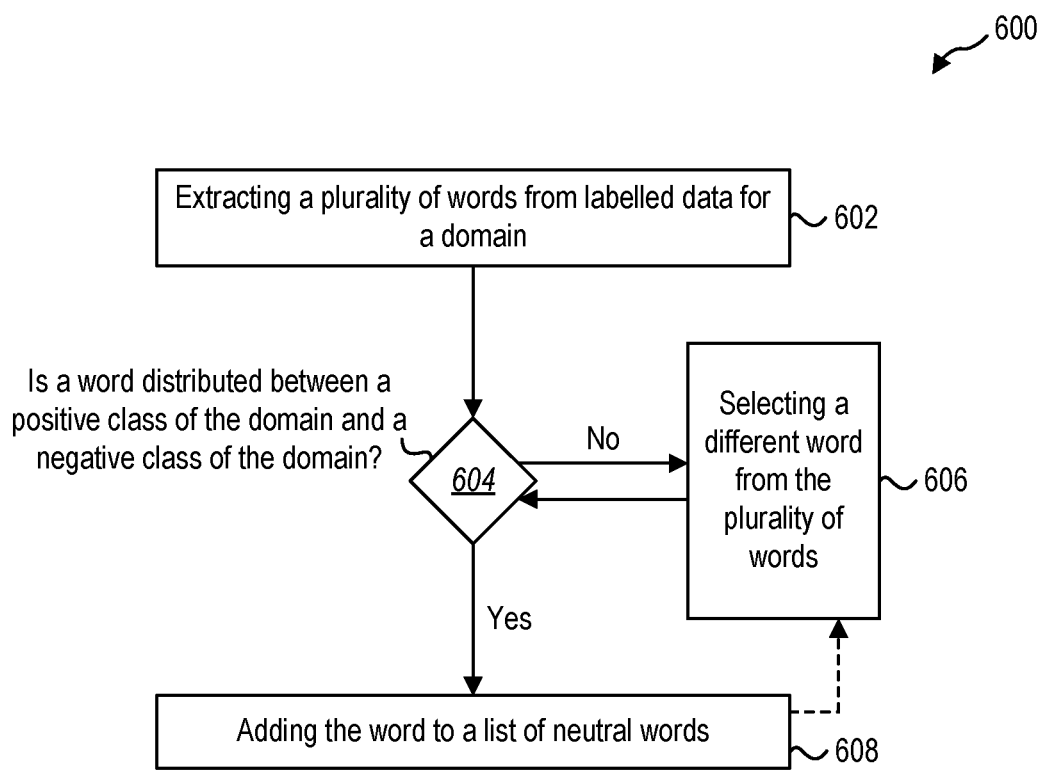
FIG. 6 illustrates an example method for identifying neutral words in accordance with implementations of the present disclosure.

Referring now to FIG. 6, illustrated is an example method 600 for identifying neutral words 16. One or more of the neutral words 16 may be used by a search engine 102 to automatically expand an original search query 10. The actions of the method 600 are discussed below with reference to the architecture of FIG. 1.

At 602, the method 600 includes extracting a plurality of words from labelled data for a domain. A word extraction component 104 may extract or otherwise obtain a plurality of words 30 from labelled data 28. The labelled data 28 may include a collection of words 30 included in the search queries (e.g., several hundred thousand words included in the search queries). The labelled data 28 may include known search queries for the search engine 102. As such, the labelled data 28 may be generated from users worldwide based on the interactions of the users with the search engine 102. For example, the labelled data 28 provides information on search queries entered by millions of users worldwide for a variety of domains.

At 604, the method 600 includes determining for each word of the plurality of words, whether the word is distributed between a positive class of the domain and a negative class of the domain. The word extraction component 104 may determine whether the words 30 are associated with a positive class of a domain, a negative class of a domain, or distributed among the positive class and the negative class.

The word extraction component 104 may use the PMI 24 of the words 30 to determine whether the words are associated with a positive class of a domain, a negative class of a domain, or distributed among the positive class and the negative class. In an implementation, the word extraction component 104 may compare the absolute difference of the PMI 24 of the occurrence of the word 30 in the positive class and the PMI 24 of the occurrence of the word 30 in the negative class to a threshold. The threshold may be a value within a range of zero. For example, the threshold is a value of 0.5. The threshold may be larger or smaller based on the domain or user preference.

If the absolute difference of the occurrence of the word 30 in the positive class and the negative class is a number below the threshold value, the word extraction component 104 may determine that the word 30 is neutral (e.g., the word 30 operates in both the positive class and the negative class of the domain). As such, the neutral words 16 have a co-occurrence statistics with both the positive class and the negative class of the domain. If the absolute difference of the occurrence of the word 30 is a number above the threshold value, the word extraction component 104 may determine that the word 30 is biased towards a class and is distributed either in the positive class of the domain or the negative class of the domain, and therefore, the word 30 is not a neutral word.

At 606, the method 600 includes selecting a different word from the plurality of words if the word is biased towards the positive class of the domain or the negative class of the domain. If the absolute difference of the occurrence of the word 30 is a number above the threshold value, the word extraction component 104 may determine that the word 30 is biased towards a class and may select a different word of the plurality of words to evaluate. The method 600 may return to 604 to evaluate the different word selected from the plurality of words.

At 608, the method 600 includes adding the word to a list of neutral words. The word extraction component 104 may add the word to a list of identified neutral words 16 based on identifying that the word 30 is distributed closely among the positive class and the negative class (e.g., the absolute difference of the occurrence of the word 30 in the positive class and the negative class is a number below the threshold). The method 600 may return to 606 and 604 to evaluate a different word selected from the plurality of words.

The word extraction component 104 may remove articles and other stop words from the identified neutral words 16. Adding articles or other stop words to the original search query 10 may not help the classification model 108 identify the domain intent of the original search query 10.

In addition, the word extraction component 104 may provide a ranked list 26 of the neutral words 16. The neutral words 16 may be ranked based on a frequency of the neutral words 16 appearing in the labelled data 28. The neutral words 16 with a higher frequency (e.g., occur more frequently in the labelled data 28) may be placed higher in the ranked list 26 relative to the neutral words 16 with a lower frequency (e.g., occur less frequently in the labelled data 28). Neutral words 16 with a lower frequency may identify outlier words.

The method 600 may be used to automatically extract neutral words 16 to use in expanding an original search query 10 to create an expanded search query 14 to help classify the original search query 10 as being directed towards a specific domain or not.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure is related to enriching a query for classifying queries. Search queries that are shorter in length (e.g., the query length is five words or less) without explicit words in the identifying the domain of the search may be difficult to classify into a specific domain. In addition, search queries with acronyms may also be difficult to classify into a specific domain. Search queries targeted with a specific website or specific named entity may also be difficult to classify into a specific domain.

The methods and systems receive an original search query and automatically expand the original search query by adding one or more non-semantic neutral words to create an expanded search query. The neutral words may have an equal probability of being in the positive class or negative class of a domain. In an implementation, determining whether a word has an equal probability of being in the positive class or negative class of a domain includes comparing an absolute difference of the PMI of the occurrence of the word in the positive class and the PMI of the occurrence of the word in the negative class to a threshold. The threshold is a value close to zero. For example, the threshold is a value of 0.0005. The threshold may be larger or smaller based on the domain or user preference.

If the absolute difference of the occurrence of the word is a number above the threshold value, the word is biased towards a class and is distributed either in the positive class of the domain or the negative class of the domain, and therefore, the word is not a neutral word. If the absolute difference of the occurrence of the word in the positive class and the negative class is a number below the threshold value, the word is neutral (e.g., the word operates in both the positive class and the negative class of the domain). The neutral words have a co-occurrence statistics with both the positive class and the negative class of the domain.

The neutral words may be selected from labelled data that includes a collection of words included in search queries for a domain. Thus, different neutral words may be selected for different domains. The neutral words may be selected independently from the words included in the original search query. As such, the neutral words may be unrelated to the words included in the original search query.

The expanded search query includes the words from the original search query and one or more of the neutral words. A single neutral word may be selected to expand the original search query, or a combination of the neutral words may be selected to expand the original search query. In an implementation, the expanded search query is automatically completed (e.g., without additional input from a user) with the selected neutral words in combination with the words from the original search query.

The methods and systems automatically classify the original search query using the expanded search query. The neutral words may help a classification model identify an intent of the original search query by pushing the expanded search query to either the positive class of the domain or the negative class of the domain. By adding one or more of the neutral words to the original search query to create the expanded search query, the classification model may have additional context to use to identify the expanded search query more quickly and efficiently as correctly belonging to the positive class of the domain (e.g., the intent of the original search query is the domain) or the negative class (e.g., the intent of the original search query is not for the domain). If the original search query is ambiguous or difficult to classify by the classification model, by expanding the original search query with one or more neutral words, the classification model may use the expanded search query to correctly classify the intent of the original search query.

As such, the methods and systems improve query classification when there is little or no context available in the original search query by expanding the original search query using one or more neutral words.

One example use case includes an original search query with a name of an adult entertainer. The search engine automatically adds one or more neutral words 16 (e.g., movie, website, image) to the original search query to create an expanded search query with the adult entertainer's name from the original search query in combination with the one or more neutral words (movie, image, website). The classification model evaluates the expanded search query and returns a classification with a positive classification for adult content. The search engine receives the classification with a positive classification for adult content and provides altered search results in response to the original search query based on the classification of the expanded search query. The altered search results may include blocking presenting any search results in response to the original search query. In addition, the altered search results may also include filtering out adult content or adult websites in response to the original search query.

Another example use case includes an original search query for a DIY project that included an acronym for a DIY project. As such, the original search query only included one word. The search engine automatically adds one or more neutral words to the original search query to create an expanded search query and send the expanded search query to the classification model. The classification model evaluates the expanded search query and returns a classification with a positive classification for DIY. The search engine receives the classification with the positive classification for DIY and presents altered search results for the original search query based on the classification of the expanded search query. For example, the altered search results include a ranked list of content with DIY content placed higher in the altered search results. In addition, the search engine may uses a different interface for presenting the altered search results. Thus, instead of listing the altered search results on a webpage, the search engine presents the altered search results in a cascading, interactive, waterfall so a user can easily view images of the altered search results.

One technical advantage of the methods and systems is the improvement of performance of the machine learning models without targeted data collection (cost savings) and costly retraining when leakages of unwanted content occur in the search results. The methods and systems use the available training data (on which the model was built) to construct the expanded query. The methods and systems automatically extract and expand the query using the same model. As such, the methods and systems reduce targeted data collection efforts for each mistake a model makes, and subsequently, reduces model re-training to address leakage of unwanted content in the search results.

As such, the methods and systems expand the original search query by automatically extracting neutral words and adding one or more neutral words to create an expanded search query to help classify the original search query as being directed towards a specific domain or not. The query expansion technique ensures capturing many false negatives (e.g., original search queries misclassified by the classification model) while preventing the generation of additional false positives (e.g., the classification model misclassifying the expanded search query).

(A1) Some implementations include a method for performing a classification for a search query. The method includes receiving (502) an original search query (e.g., original search query 10). The method includes expanding (504) the original search query by adding one or more neutral words (e.g., neutral words 16) to create an expanded search query (e.g., expanded search query 14). The method includes classifying (506) the original search query using the expanded search query.

(A2) In some implementations, the method of A1 includes automatically controlling distribution of content at least according to the classification of the original search query.

(A3) In some implementations of the method of A1 or A2, classifying the original search query includes identifying the original search query as belonging to a positive class (e.g., positive classification 36) of a domain or a negative class (e.g., negative classification 38) of the domain.

(A4) In some implementations of the method of A1-A3, the one or more neutral words are words which have been observed in a training data set to occur with substantially similar frequency between the positive class and the negative class.

(A5) In some implementations, the method of any of A1-A4 includes automatically controlling distribution of content by providing altered search results (e.g., altered search results 22) based on the classification of the original search query.

(A6) In some implementations of the method of any of A1-A5, the altered search results include in accordance with the classification being the positive class, presenting search results; and in accordance with the classification being the negative class, presenting only a filtered subset of the search results that filters out the search results corresponding to the positive class.

(A7) In some implementations, the method of any of A1-A6 includes using a different interface for presenting the altered search results.

(A8) In some implementations of the method of any of A1-A7, expanding the original search query includes automatically completing the original search query with the one or more neutral words.

(A9) In some implementations of the method of any of A1-A8, the expanded search query includes using the original search query together with one extracted neutral word of the one or more neutral words.

(B1) Some implementations include a method for identifying neutral words (e.g., neutral words 16). The method includes extracting (602) a plurality of words (e.g., words 30) from labelled data (e.g., labelled data 28) for a domain. The method includes, for each word of the plurality of words, determining (604) whether the word is distributed between a positive class and a negative class of the domain; and adding (608) the word to a list of neutral words (e.g., neutral words 16) based on identifying the word as a being distributed between the positive class and the negative class.

(B2) In some implementations of the method of B1, determining whether the word is distributed between the positive class and the negative class uses pointwise mutual information (PMI) (e.g., PMI 24) of the word in the positive class and the negative class.

(B3) In some implementations, the method of B1 or B2 includes comparing an absolute difference of the PMI of the word in the positive class and the PMI of the word in the negative class to a threshold (e.g., threshold 32); determining the word is associated with the positive class or the negative class in response to the absolute difference lower than the threshold; and determining the word is distributed between the positive class and the negative class in response to the absolute difference being below the threshold or equal to the threshold.

(B4) In some implementations, the method of any of B1-B3 includes ranking the list of neutral words (e.g., ranked list 26) based on a frequency of the neutral words in the labelled data.

(B5) In some implementations, the method of any of B1-B4 includes removing articles and stop words from the list of neutral words.

(B6) In some implementations of the method of any of B1-B5, the neutral words are not semantically matched to query words.

Some implementations include a system (system 100). The system includes one or more processors; memory in electronic communication with the one or more processors; and instructions stored in the memory, the instructions being executable by the one or more processors to perform any of the methods described here (e.g., A1-A9, B1-B6).

Some implementations include a search engine (e.g., search engine 102). The search engine includes one or more processors; memory in electronic communication with the one or more processors; and instructions stored in the memory, the instructions being executable by the one or more processors to perform any of the methods described here (e.g., A1-A9, B1-B6).

Some implementations include a computer-readable storage medium storing instructions executable by one or more processors to perform any of the methods described here (e.g., A1-A9, B1-B6).

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for performing a classification for an original search query, comprising:
    receiving an original search query;
    identifying a domain associated with the original search query, the domain having a positive class and a negative class;
    before classifying the original search query, expanding the original search query by adding one or more neutral words to create an expanded search query, wherein the one or more neutral words co-occur in the positive class of the domain and in the negative class of the domain;
    classifying the original search query using the expanded search query, wherein classifying the original search query includes determining an intent for the original search query to correspond to the positive class of the domain or the negative class of the domain; and
    automatically controlling distribution of content at least according to the classification of the original search query.

2. The method of claim 1, wherein the domain is adult content.

3. The method of claim 1, wherein the one or more neutral words are words which have been observed in a training data set to occur with an equal probability of being in the positive class or the negative class.

4. The method of claim 1, further comprising:
    automatically controlling distribution of content by providing altered search results based on the classification of the original search query.

5. The method of claim 4, wherein the altered search results include:
    in accordance with the classification being a positive class of a domain, presenting search results; and
    in accordance with the classification being a negative class of the domain, presenting only a filtered subset of the search results that filters out the search results corresponding to the positive class.

6. The method of claim 4, further comprising:
    using a different interface for presenting the altered search results.

7. The method of claim 1, wherein expanding the original search query further includes automatically completing the original search query with the one or more neutral words.

8. The method of claim 1, wherein the expanded search query includes using the original search query together with one extracted neutral word of the one or more neutral words.

9. The method of claim 1, wherein adding one or more neutral words to create an expanded search query comprises:
    extracting a plurality of words from labelled data for a domain;
    for each word of the plurality of words:
        determining whether the word is distributed between the positive class and the negative class of the domain; and
        adding the word to a list of neutral words based on identifying the word as a being distributed between the positive class and the negative class.

10. A system, comprising:
    one or more processors;
    memory in electronic communication with the one or more processors; and
    instructions stored in the memory, the instructions executable by the one or more processors to:
        receive an original search query;
        determine a domain associated with the original search query, the domain having a positive class and a negative class;
        before classifying the original search query, expand the original search query by adding one or more neutral words to create an expanded search query, wherein the one or more neutral words co-occur in the positive class of the domain and in the negative class of the domain;
        classify the original search query using the expanded search query wherein classifying the original search query includes determining an intent for the original search query to correspond to the positive class of the domain or the negative class of the domain; and automatically control distribution of content at least according to classification of the original search query.

11. The system of claim 10, wherein the domain is adult content.

12. The system of claim 10, wherein the instructions are further executable by the one or more processors to:

automatically control the distribution of content by providing altered search results based on the classification of the original search query.

13. The system of claim 12, wherein the instructions are further executable by the one or more processors to use a different interface for presenting the altered search results.

14. The system of claim 10, wherein the instructions are further executable by the one or more processors to expand the original search query by automatically completing the original search query with the one or more neutral words.

15. The system of claim 10, wherein the instructions are further executable by the one or more processors to use the original search query together with one extracted neutral word of the one or more neutral words in the expanded search query.

16. A method for performing a classification for an original search query, comprising:

receiving an original search query;

identifying a domain associated with the original search query, the domain having a positive class and a negative class;

before classifying the original search query, expanding the original search query by adding one or more neutral words to create an expanded search query, wherein the one or more neutral words co-occur in the positive class of the domain and in the negative class of the domain;

classifying the original search query using the expanded search query, wherein classifying the original search query includes determining an intent for the original search query to correspond to the positive class of the domain or the negative class of the domain; and automatically controlling distribution of content at least according to the classification of the original search query, wherein the domain is a binary domain.

17. The method of claim 16, wherein the neutral words are semantically unrelated to the words of the original search query.

* * * * *